United States Patent
Liu et al.

(10) Patent No.: US 7,860,177 B2
(45) Date of Patent: Dec. 28, 2010

(54) RECEIVER DETECTING SIGNALS BASED ON SPECTRUM CHARACTERISTIC AND DETECTING METHOD THEREOF

(75) Inventors: Tai-Cheng Liu, Kaohsiung (TW); Hsuan-Yu Liu, Taipei (TW); Po-Yuen Cheng, San Jose, CA (US)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 457 days.

(21) Appl. No.: 11/846,521

(22) Filed: Aug. 28, 2007

(65) Prior Publication Data

US 2009/0060006 A1      Mar. 5, 2009

(51) Int. Cl.
   *H04K 1/10*   (2006.01)
   *H04J 11/00*  (2006.01)
(52) U.S. Cl. .................... 375/260; 370/210
(58) Field of Classification Search ........... 375/260, 375/147, 224, 225, 227, 262, 265, 267, 340; 370/208, 210, 395.1; 708/400, 402–405
   See application file for complete search history.

(56) References Cited

U.S. PATENT DOCUMENTS

| | | | |
|---|---|---|---|
| 6,177,951 B1 | 1/2001 | Ghosh | |
| 6,707,798 B1 | 3/2004 | Klein | |
| 6,934,340 B1* | 8/2005 | Dollard | 375/260 |
| 2003/0163044 A1* | 8/2003 | Heimdal et al. | 600/437 |
| 2004/0190648 A1* | 9/2004 | Anim-Appiah et al. | 375/324 |
| 2005/0220175 A1* | 10/2005 | Zhou | 375/141 |
| 2006/0104198 A1* | 5/2006 | Takano | 370/210 |
| 2008/0310525 A1* | 12/2008 | Lin et al. | 375/260 |

OTHER PUBLICATIONS

IEEE Standard 802.11a-1999.
IEEE Standard 802.11b-1999.

\* cited by examiner

*Primary Examiner*—Young T. Tse
(74) *Attorney, Agent, or Firm*—Winston Hsu; Scott Margo

(57) ABSTRACT

A receiver for receiving a target signal complying with a specific communication specification comprising a specific spectrum characteristic includes a detecting module for detecting a packet of an input signal, a transforming unit for transforming the packet from a time domain to a frequency domain to derive a spectrum characteristic of the input signal, and a determining unit for determining whether the input signal is the target signal according to the spectrum characteristic of the input signal. Therefore, the proposed receiver is able to reduce packet miss rate and false alarm rate while robust to a severe channel condition, and achieve fast and accurate signal quality detection.

19 Claims, 14 Drawing Sheets

RECEIVER DETECTING SIGNALS BASED ON SPECTRUM CHARACTERISTIC AND DETECTING METHOD THEREOF

BACKGROUND

The present invention relates to a wireless communication system, and more particularly, to a receiver receiving target signals complying with a specific wireless communication specification comprising a specific spectrum characteristic, and a receiving method thereof.

In a wireless local area network (WLAN) system, multiple carriers share a frequency band, and each carrier occupies a sub-band (i.e. a channel) of the frequency band for signal transmission. In general, carriers are put as far away from each other as possible by channel planning in order to avoid adjacent channel interference. However, because the amount of carriers in a frequency band has increased rapidly due to the growth of wireless apparatus, carriers being arranged closely in the frequency band is unavoidable (for example, a neighbor channel may only be ±5 MHz from a target channel), causing signal overlaps at the receiving end.

In order to reduce the effects of adjacent channel interference or adjacent interference sources (such as probe requests sent by devices in the adjacent band), a traditional receiver 100 is designed to have the architecture shown in FIG. 1. When receiving signals, the traditional receiver 100 initially down converts a received signal to base band and extracts a packet of the received signal through a packet detection unit 110. After an automatic gain controller (AGC) 120 locks the packet, a signal quality detecting unit 130 detects the packet, which is usually a preamble packet or a packet of training sequences of the received signal, to check whether the received signal is a desired in-band signal (i.e. a signal in the same channel used for transmitting desired data). When the received signal is detected as the in-band signal, the following blocks in the receiver 100 proceed to obtain the data carried in the received signal. If the signal quality detecting unit 130 determines that the received signal is not the in-band signal, however, the receiver 100 discards the received signal and restarts to detect a next incoming signal.

As can be seen, a main function of the signal quality detecting unit 130 is to quickly and correctly differentiate desired in-band signals from out-of-band signals that overlap into the target receiving channel of the receiver 100. If the signal quality detecting unit 130 mistakes the out-of-band signal as the in-band signal, a false alarm occurs. The data decoded by the receiver 100 is incorrect in this situation, and even if the error is detected by the decoder later, power is consumed and a time loss is formed. The faster the out-of-band signal is distinguished by the signal quality detecting unit 130, the sooner the receiver 100 can restart to prepare for detecting the next incoming signal, and therefore there is a lower packet miss rate.

Common techniques utilized by the signal quality detecting unit 130 for detecting in-band signals are auto-correlation and cross-correlation, which are standard methods of estimating the degree to which two series are correlated in the time domain. However, efficiency of the signal quality detecting unit 130 adopting auto-correlation or cross-correlation may not be acceptable when the channel condition is severe. This is because the in-band signal may be distorted by inter-symbol-interference (ISI) caused by severe multi-path channels. Further, the correlation strength of the in-band signal derived by the signal quality detecting unit 130 becomes weaker due to interferences so that the signal quality detecting unit 130 cannot correctly distinguish the in-band signal from interference noise.

SUMMARY

One objective of the present invention is therefore to provide a method of detecting an in-band signal complying with a specific communication specification and a receiver applying said method, which can reduce the packet miss rate and the false alarm rate while robust to a severe channel condition. The method utilizes frequency information of a received packet to differentiate an in-band signal from out-of-band signals, therefore fast and accurate signal quality detection is achieved.

According to an exemplary embodiment of the present invention, a method of detecting a target signal complying with a specific communication specification comprising a specific spectrum characteristic is disclosed. The method comprises detecting a packet of an input signal; transforming the packet from a time domain to a frequency domain to derive a spectrum characteristic of the input signal; and determining whether the input signal is the target signal according to the spectrum characteristic of the input signal.

According to another exemplary embodiment of the present invention, a receiver for receiving a target signal complying with a specific communication specification comprising a specific spectrum characteristic is disclosed. The receiver comprises a detecting module, a transforming unit and a determining unit. The detecting module is for detecting a packet of an input signal. The transforming unit is coupled to the detecting module, and is for transforming the packet from a time domain to a frequency domain to derive a spectrum characteristic of the input signal. The determining unit is coupled to the transforming unit, and is for determining whether the input signal is the target signal according to the spectrum characteristic of the input signal. These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
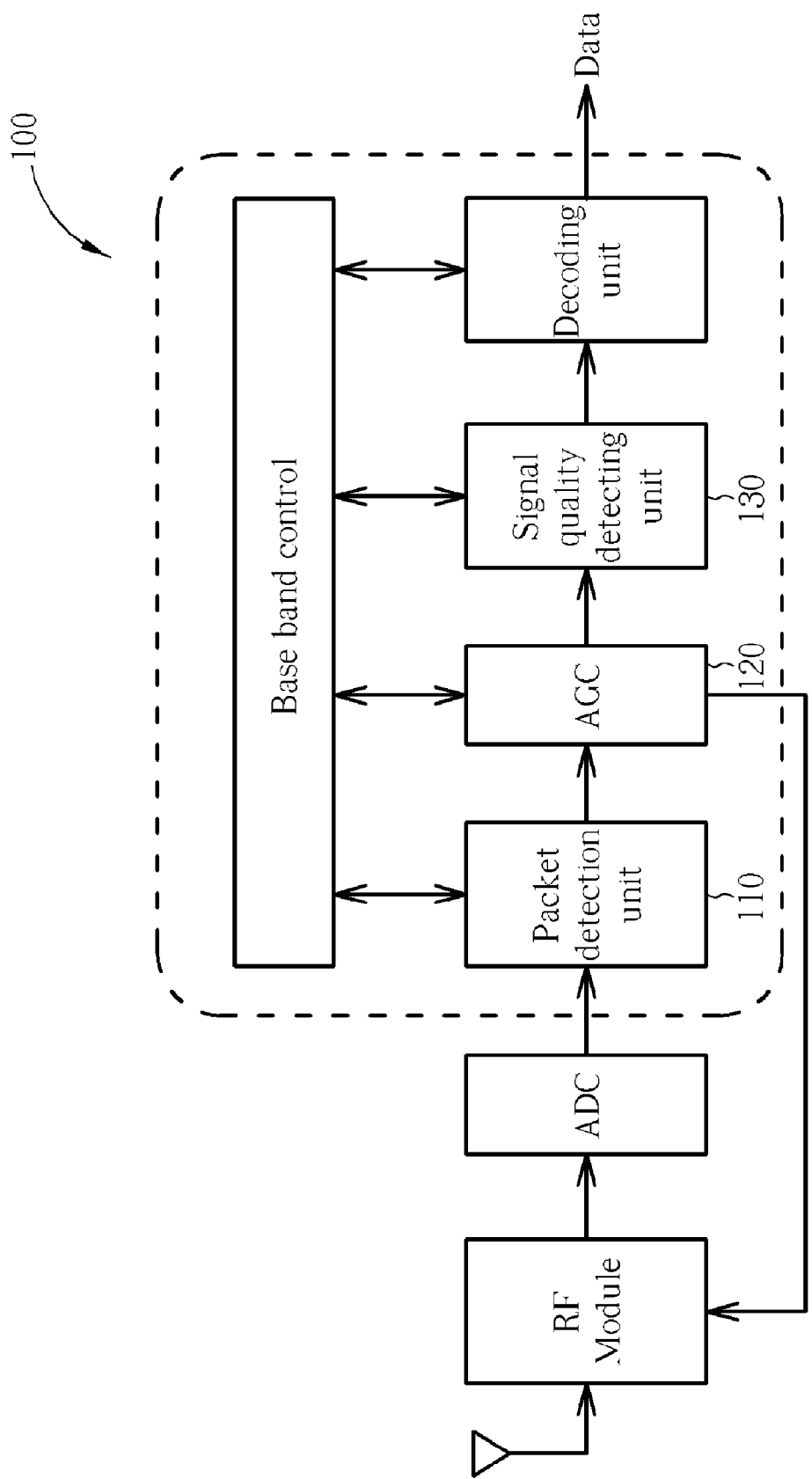
FIG. 1 is a block diagram of a conventional receiver.

The present invention provides a receiver that is able to properly detect target signals (i.e. in-band signals) in a short time. Compared to the conventional receiver 100 shown in FIG. 1, a signal quality detecting unit of the proposed receiver further utilizes frequency domain information of an input signal to help determine whether the input signal is the target signal. In one embodiment, spectrum of the input signal is analyzed to examine a correlation degree between the spectrum of the input signal and a transmission spectrum mask defined in the communication specification of the target signal. Therefore, the present invention is suitable for detecting any in-band signal complying with a specific spectrum characteristic, and can be implemented in most wireless broadband systems, such as WLAN, Worldwide Interoperability for Microwave Access (WiMAX), and Ultra-wideband (UWB).

Figure 2:
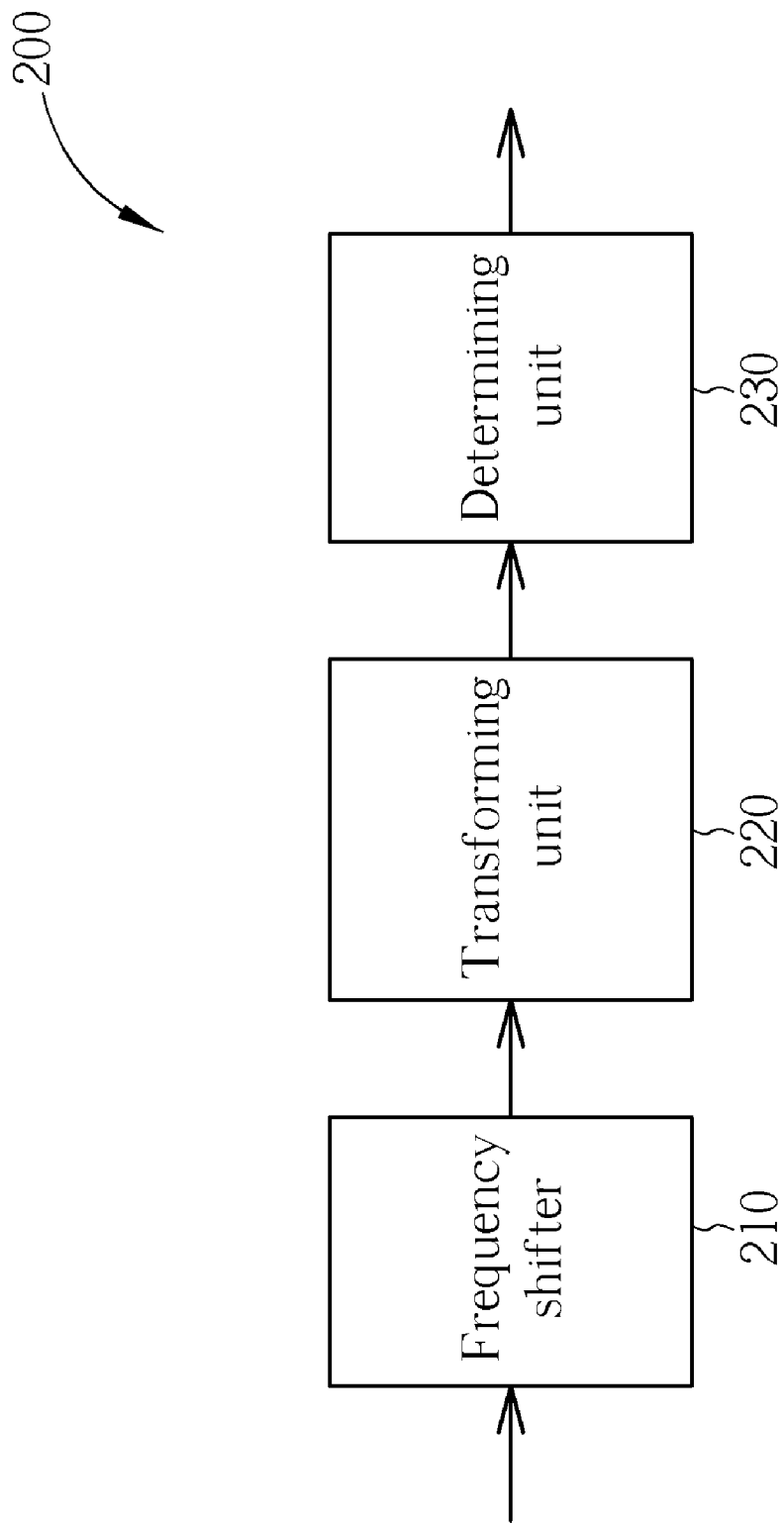
FIG. 2 is a block diagram of a signal quality detecting unit of a receiver according to an exemplary embodiment of the present invention.
Figure 3A:
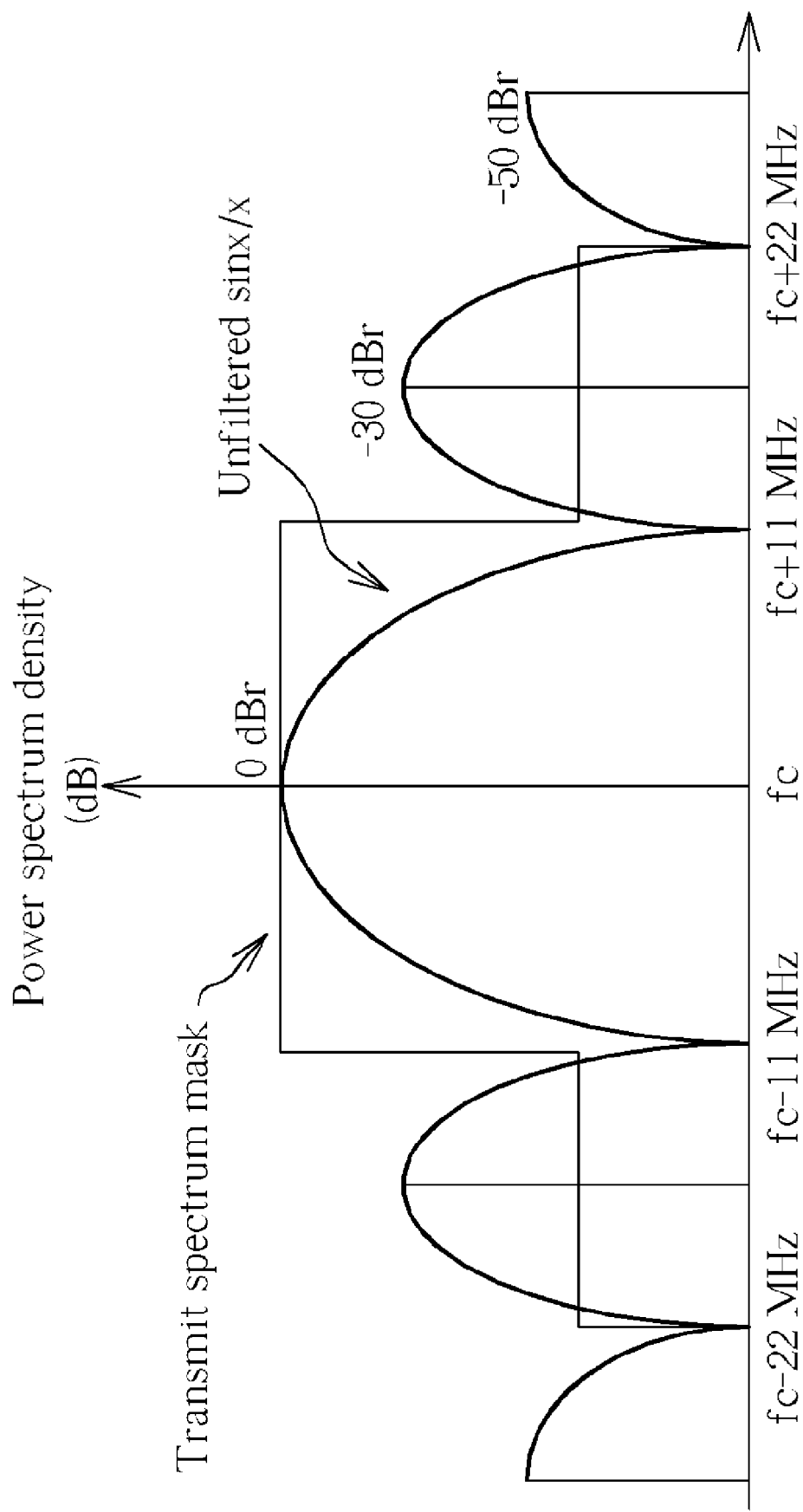
FIG. 3(a) is a diagram showing a transmission spectrum mask standard defined in the IEEE802.11b Barker/CCK specification.
Figure 3B:
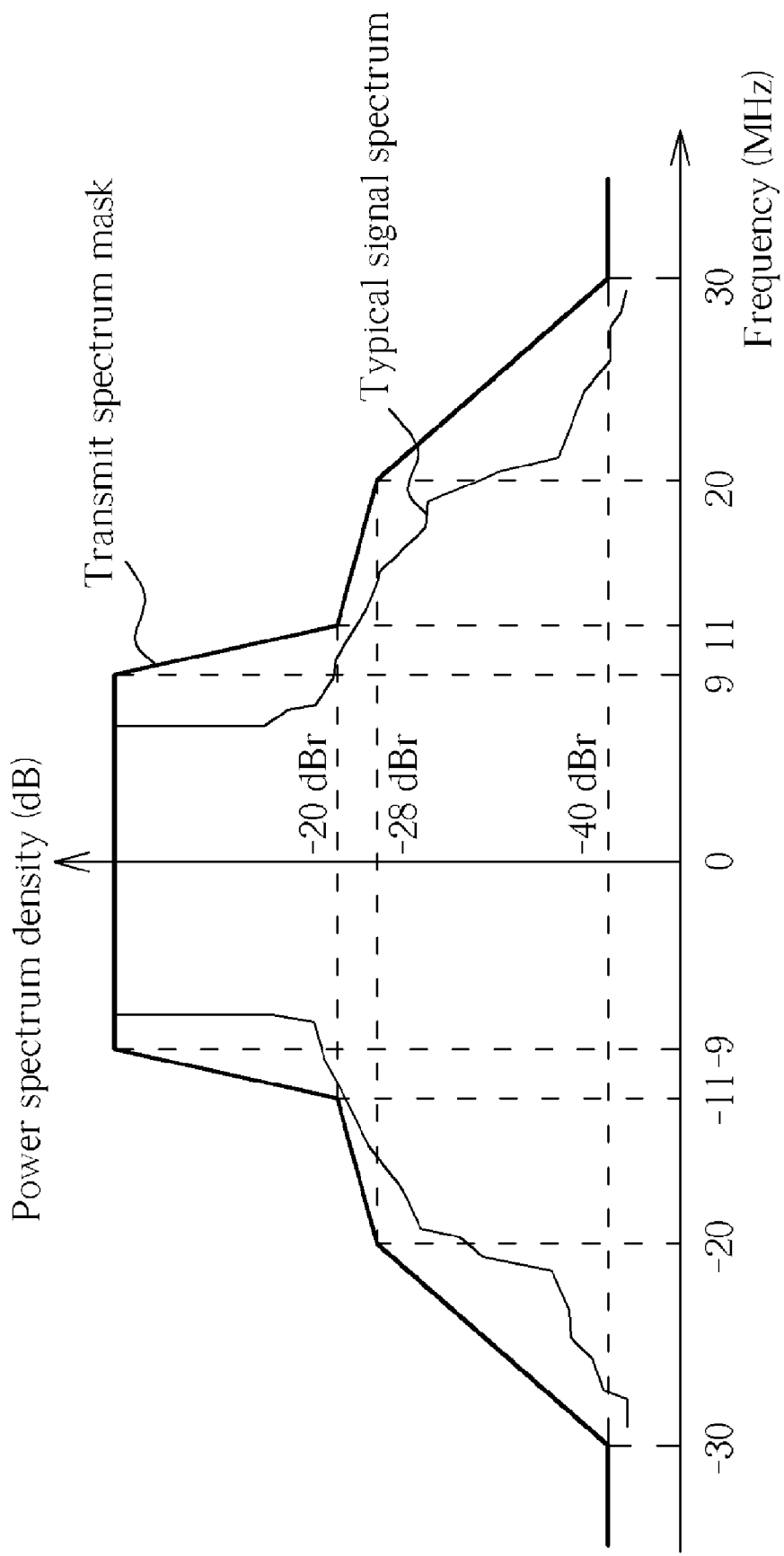
FIG. 3(b) is a diagram showing a transmission spectrum mask standard defined in the IEEE802.11a OFDM specification.

FIG. 2 is a block diagram of a signal quality detecting unit 200 according to an exemplary embodiment of the present invention. As shown in FIG. 2, the signal quality detecting unit 200 comprises a frequency shifter 210, a transforming unit 220 and a determining unit 230. It should be noted that the frequency shifter 210 is an optional element of the signal quality detecting unit 200, the reason for which will be introduced later. When a packet detection unit (not shown) of the receiver has detected a packet of an input signal, the packet is delivered to the signal quality detecting unit 200. The Complementary Code Keying (CCK) specification and Orthogonal Frequency Division Multiplexing (ODFM) specification are taken as examples. Their respective transmission spectrum mask standards are shown in FIG. 3(a) and 3(b). For the input signal complying with these specific communication specifications such as the OFDM specification and the CCK specification, each packet of the input signal has a spectrum characteristic corresponding to the transmission spectrum mask. The transforming unit 220 therefore transforms the packet detected by the packet detection unit from a time domain to a frequency domain to derive a spectrum characteristic of the input signal, and the determining unit 230 determines whether the input signal is the target signal according to the spectrum characteristic of the input signal.

The transformation performed by the transforming unit 220 is not limited in the present invention as long as the spectrum characteristic of the input signal can be derived. The transformation can be Fourier Transform, Fast Fourier Transform (FFT) or Discrete Cosine Transform (DCT), etc. However, since FFT is the most popular technique for time-domain and frequency-domain transformation, the following will take FFT as an example to further explain the operation and function of the transforming unit 220.

Figure 4A:
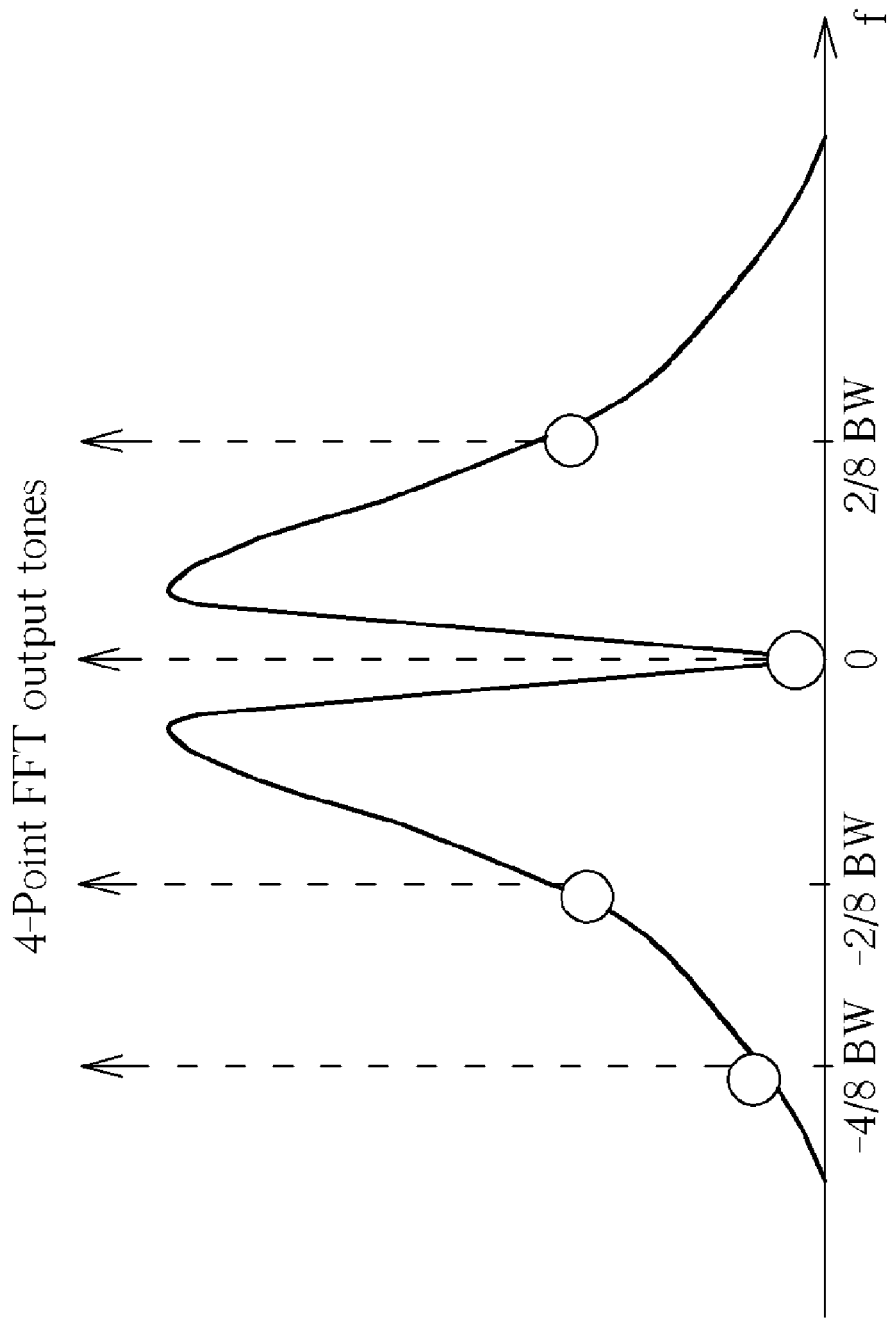
FIG. 4(a) is a diagram of output tones of an OFDM/CCK signal without frequency shift.
Figure 4B:
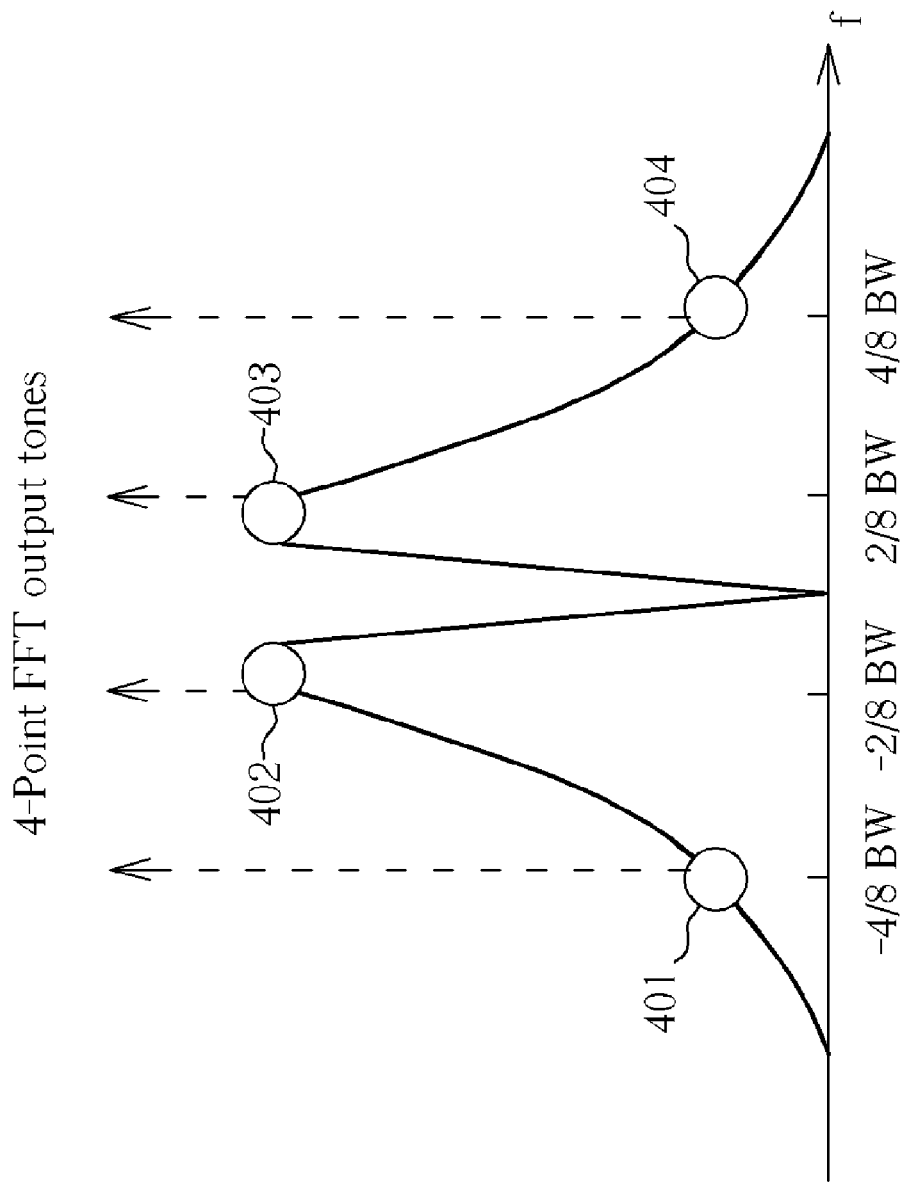
FIG. 4(b) is a diagram of output tones of an OFDM/CCK signal with frequency shift.

Detailed herein is the explanation of the reason why the frequency shifter 210 is optional. Please refer to FIG. 4(a), which is a diagram showing four output tones outputted from the transforming unit 220 after the transforming unit 220 performs 4-point FFT on a packet of a target signal (e.g. an OFDM signal or a CCK signal). Note that the special property of 4-point FFT causes one of the four output tones to fall in the DC level (i.e. 0 Hz) of the target signal. However, as can be seen from FIG. 4(a), the DC level of the OFDM signal or the CCK signal (the CCK signal is filtered by a high-pass-filter in advance to filter out the DC offset) is usually so small that the output tone at DC level may not provide an effective reference of the spectrum characteristic of the target signal to the determining unit 230. Moreover, the four output tones are unbalanced and thus may not be differentiated from interference signals. Hence, in this situation, the packet is first sent to the frequency shifter 210 to be frequency-shifted, and then the shifted packet is transformed to the frequency domain by the transforming unit 220. One general method of frequency shifting is to multiply the packet by $\exp\{j \times 2\pi \times n/M\}$ in the time domain, which is equivalent to shift 1/M frequency band in the frequency domain. An example of output tones with a ⅛ bandwidth shift is shown in FIG. 4(b). In this embodiment, output tones 401, 402, 403 and 404 corresponding to −⅜ bandwidth, −⅛ bandwidth, +⅛ bandwidth and +⅜ bandwidth of the target signal are all large enough and balanced to become effective references. Therefore, when the transforming unit 220 is a 4-point FFT unit, it co-operates with the frequency shifter 210 to provide sufficient information to the determining unit 230. However, in another embodiment, when the FFT adopted by the transforming unit 220 is larger than four points, for example, 8-point FFT, the frequency shifter 210 is not required since the remaining 7 output tones apart from the output tone at DC level are sufficient for the determining unit 230 to make decisions.

Figure 5A:
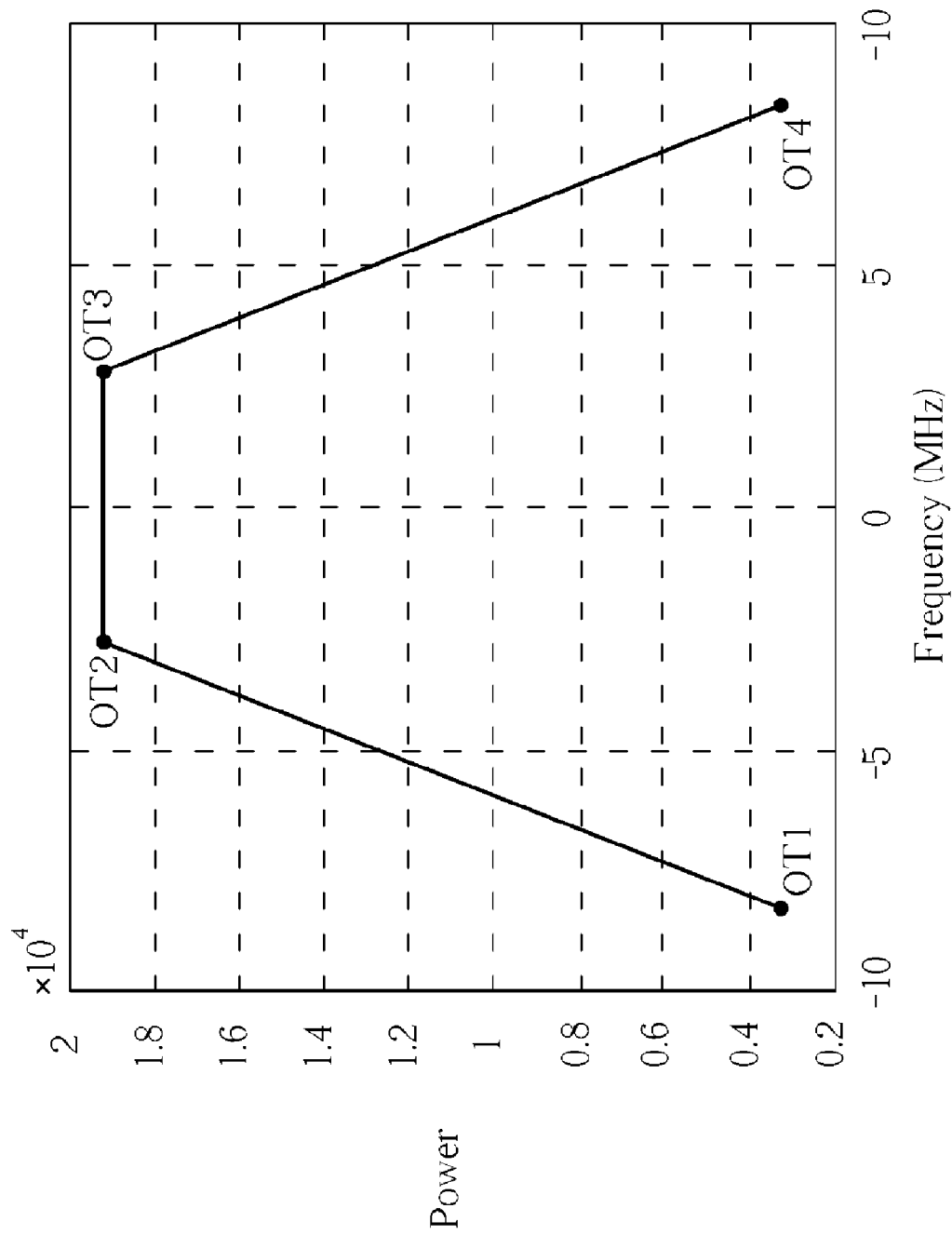
FIG. 5(a) shows a diagram of spectrum of a target signal in the target receiving channel.
Figure 5B:
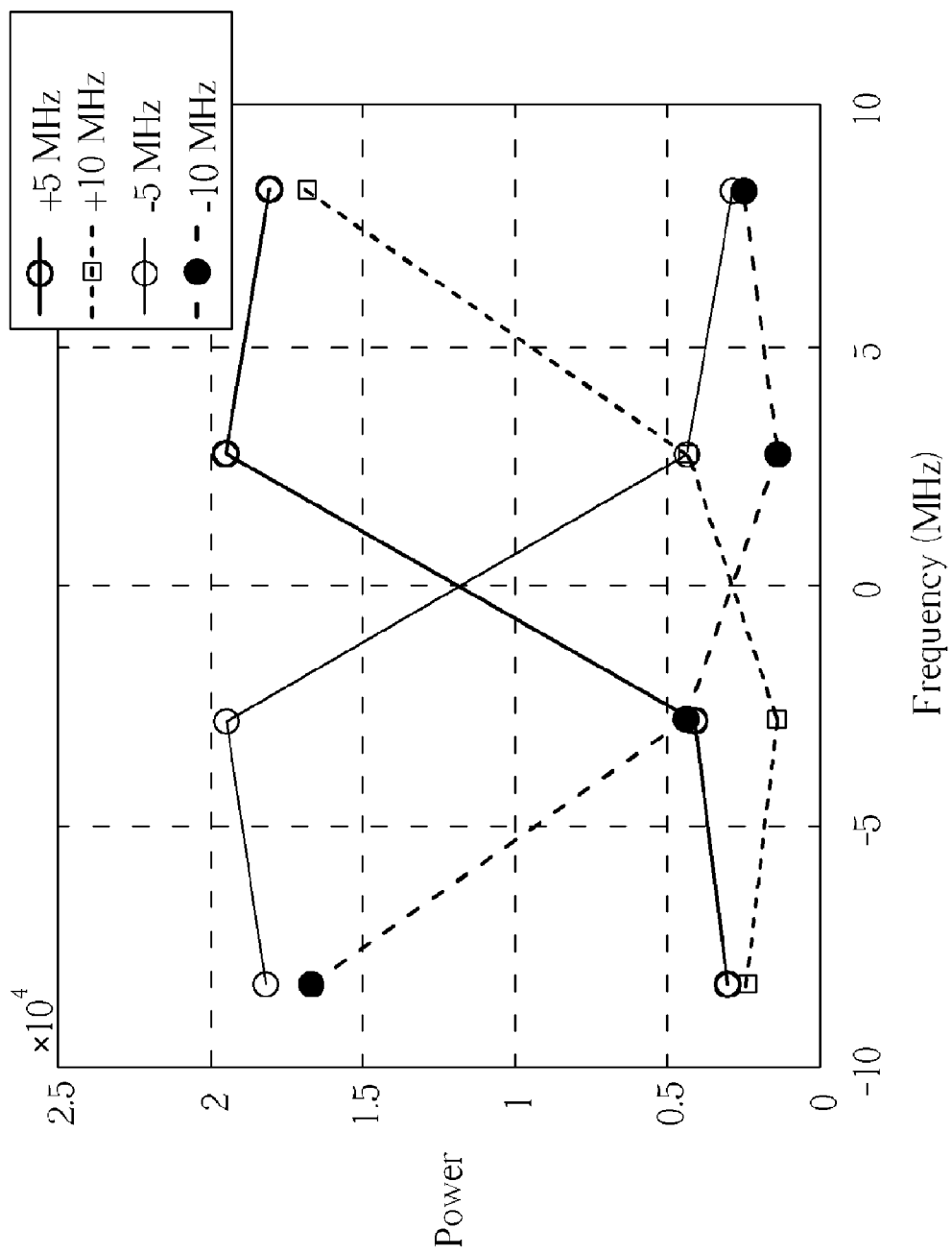
FIG. 5(b) shows a diagram of spectrums of adjacent interference signals in the target receiving channel, wherein the adjacent channel signals are in channels ±5 MHz and ±10 MHz from the target receiving channel.

FIG. 5(a) shows a diagram of spectrum of a target signal in the target receiving channel, and FIG. 5(b) shows a diagram of spectrums of adjacent interference signals in the target receiving channel, wherein the adjacent channel signals are in the channels ±5 MHz and ±10 MHz from the target receiving channel. It can be found that spectrums of the target signal and the adjacent interference signals are very different. The spectrum of the target signal in the target receiving channel is more balanced. If the spectrum is roughly divided into an in-band frequency region and an out-band frequency region, the magnitude of the output tone OT1 or output tone OT4 of the target signal in the out-band frequency region is smaller than that of the output tone OT2 or output tone OT3 of the target signal in the in-band frequency region, while magnitudes of the output tone OT1 and output tone OT4 are approximately equal. Because the output tones of the adjacent interference signals do not have these frequency characteristics, the determining unit 230 can utilize this spectrum characteristic to differentiate the target signal from other interference signals. The determining unit 230 first determines whether the spectrum characteristic (e.g. output tones) of the input signal satisfies a predetermined condition corresponding to the spectrum mask to generate a determining result, and decides that the input signal is the target signal when the determining result indicates the spectrum characteristic of the input signal satisfies the predetermined condition.

Figure 6:
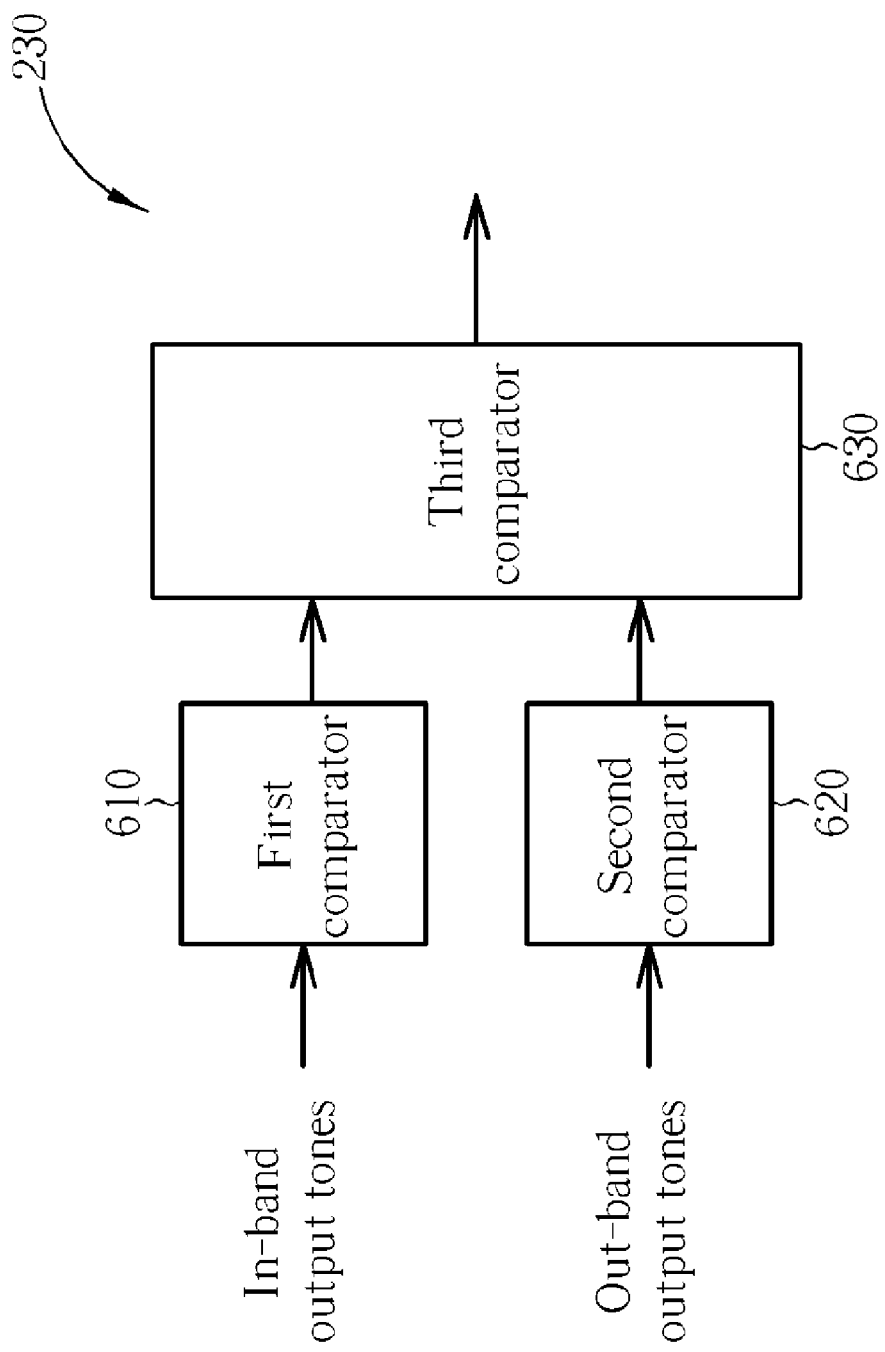
FIG. 6 is a diagram of a determining unit according to an exemplary embodiment of the present invention.

In one embodiment, the determining unit 230 determines whether the input signal is the target signal according to magnitudes of the output tones. More specifically, in one embodiment, as shown in FIG. 6, the determining unit 230 comprises a first comparator 610, a second comparator 620 and a third comparator 630, wherein the first comparator 610 selects a first output tone corresponding to the in-band frequency region (for example, a maximal output tone in the in-band frequency region), the second comparator 620 selects a second output tone corresponding to the out-band frequency region (for example, a maximal output tone in the out-band frequency region), and the third comparator 630 compares the magnitudes of the first output tone and the second output tone to determine whether the magnitude of the first output tone is larger than that of the second output tone. When the comparing result of the third comparator 630 indicates that the magnitude of the first output tone is larger than that of the second output tone, the determining unit 230 decides that the input signal is the target signal.

Figure 7:
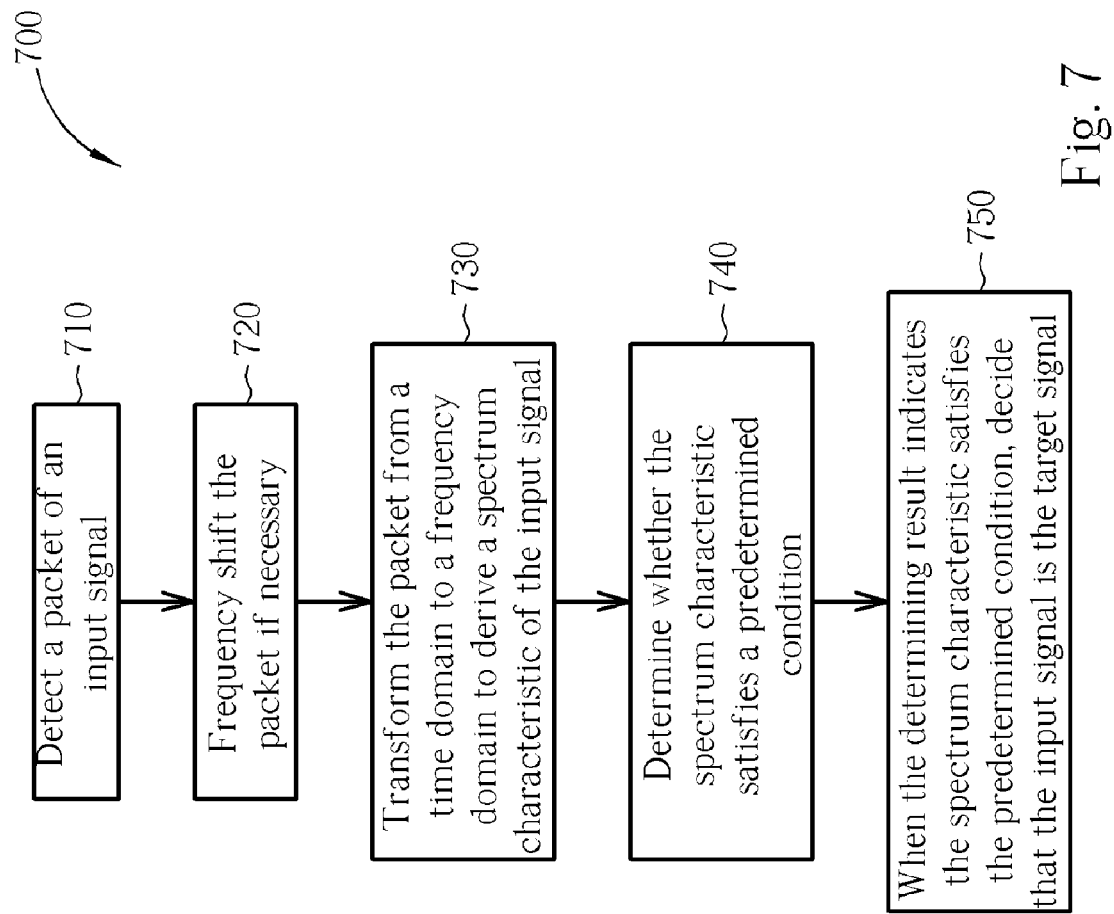
FIG. 7 is a flow chart showing the detection process performed by the signal quality detecting unit in FIG. 2 according to an exemplary embodiment of the present invention.

The above detection process can be summarized as a flow chart shown in FIG. 7. The detection process 700 comprises the following steps:

Step 710: detect a packet of an input signal.
Step 720: frequency shift the packet if necessary.
Step 730: transform the packet from a time domain to a frequency domain to derive a spectrum characteristic of the input signal.
Step 740: determine whether the spectrum characteristic satisfies a predetermined condition.
Step 750: when the determining result indicates the spectrum characteristic satisfies the predetermined condition, decide that the input signal is the target signal.

However, provided that substantially the same result is achieved, the steps of the detection process 700 need not be contiguous, that is, other steps can be intermediate.

Figure 8:
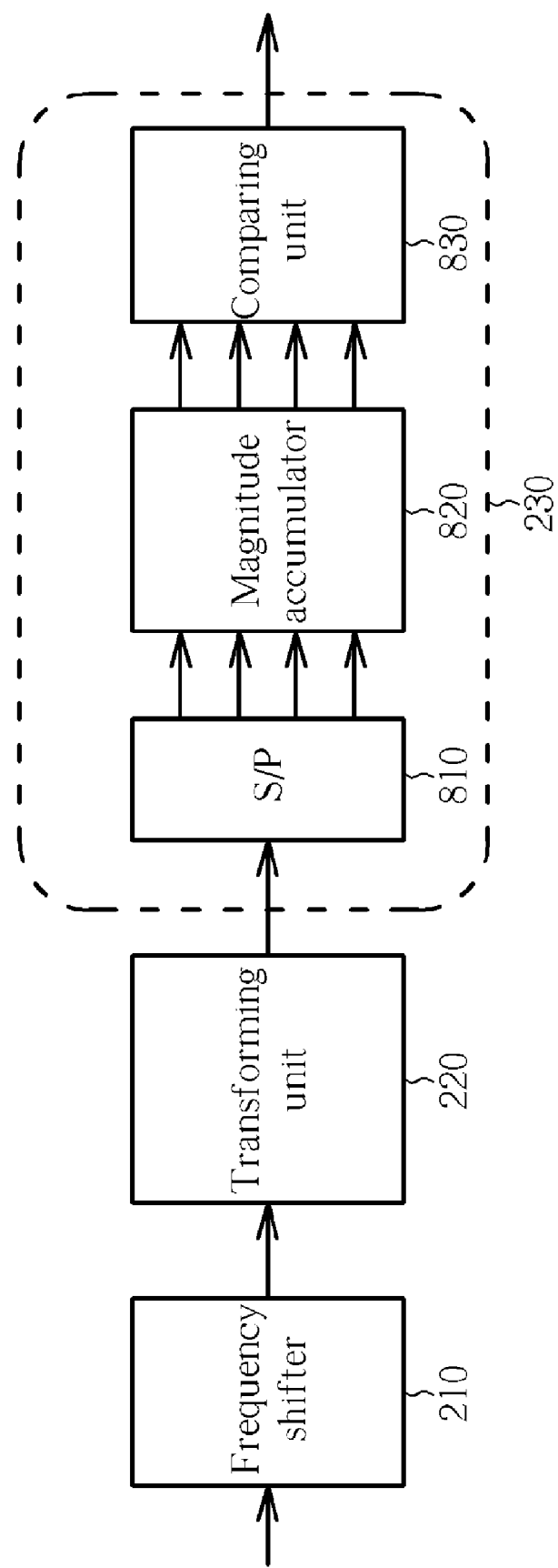
FIG. 8 is a diagram of a signal quality detecting unit according to an exemplary embodiment of the present invention.

Additionally, in order to avoid thermal noise or burst noise affecting the determination of the determining unit 230, output tones of the input signal can be accumulated before they are used for determination. Please refer to FIG. 8 in conjunction with FIG. 5(*a*). FIG. 8 shows another embodiment of the signal quality detecting unit. In this embodiment, the transforming unit 220 performs 4-point FFT on the input signal more than once to generate more than four output tones. The output tones then pass through a serial-to-parallel circuit 810 to be grouped into several groups, for example, group 1 contains output tones OP1, group 2 contains output tones OP2, group 3 contains output tones OP3, and group 4 contains output tones OP4, wherein the definition of output tones OP1, OP2, OP3 and OP4 are illustrated in FIG. 5(*a*). The magnitude accumulator 820 accumulates magnitudes of output tones in each group to generate an accumulated result, and the comparing unit 830 determines whether the accumulated result satisfies a predetermined condition corresponding to the spectrum mask to generate a determining result. When the determining result indicates the accumulated result satisfies the predetermined condition, the determining unit 230 decides that the input signal is the target signal. Similar to the embodiments of FIG. 6, the predetermined condition may be satisfied when an accumulated magnitude of first output tones corresponding to the in-band frequency region is larger than that of second output tones corresponding to the out-band frequency region. In this way, the signal-to-noise ratio (SNR) of the output tones is raised, thereby eliminating noise affect and increasing the accuracy of determining whether the input signal is the target signal.

The signal quality detecting unit utilizes the property that when the target signal complies with a specific communication specification comprising a specific transmission spectrum mask, output tones of signals which are 5 MHz or more than 5 MHz away from the target receiving channel measured in the target receiving channel are dissimilar to the spectrum characteristic corresponding to the specific transmission spectrum mask.

It should be noted that the determining unit 230 detailed in FIG. 6 or FIG. 8 is for illustrative purposes only and is not meant to be a limitation of the present invention. The predetermined condition utilized in the determining unit 230 is not limited by the above examples.

Figure 9A:
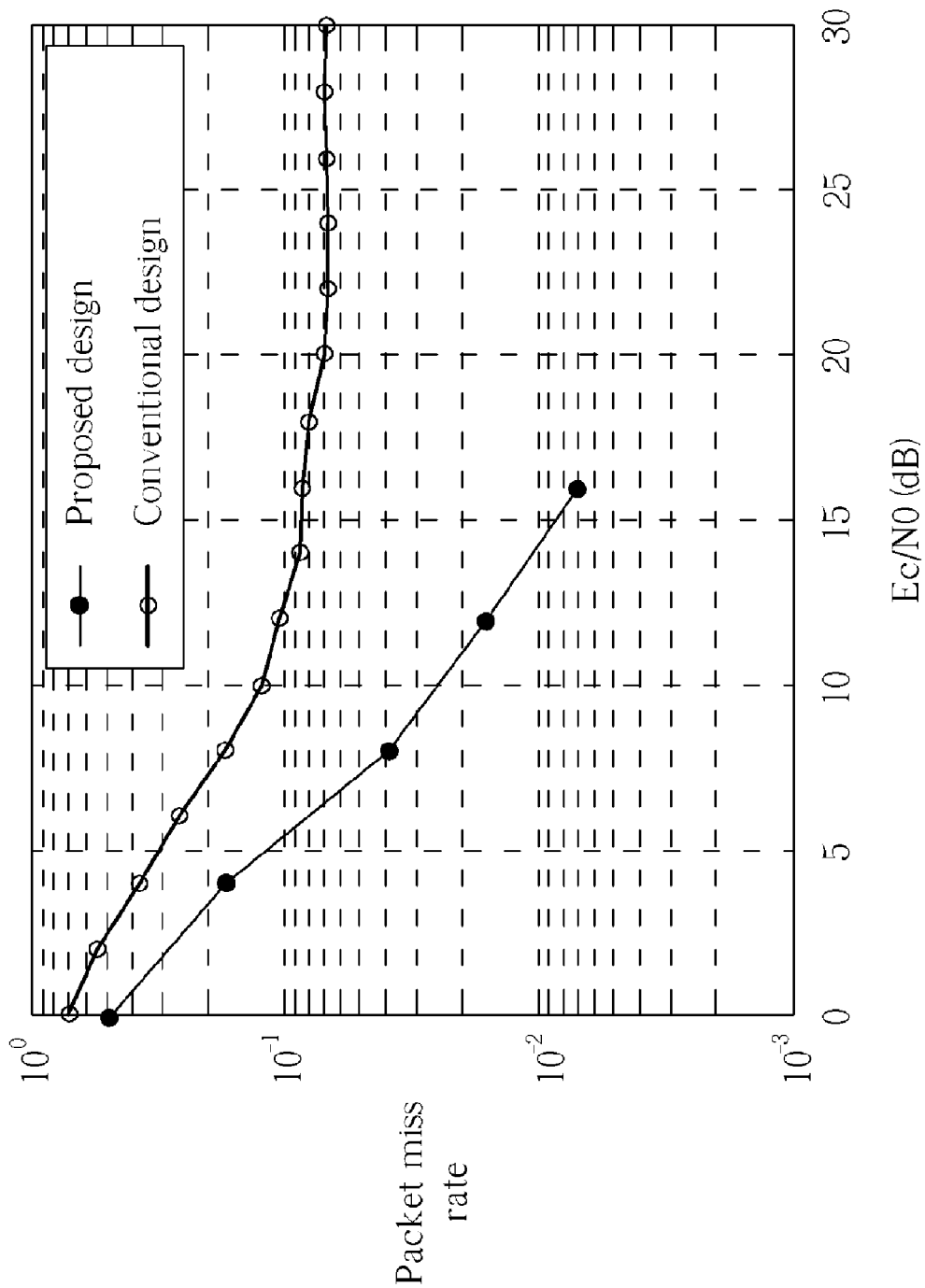
FIG. 9(a) and FIG. 9(b) show simulated improvements of the present invention in packet miss rate and false alarm rate respectively.
Figure 9B:
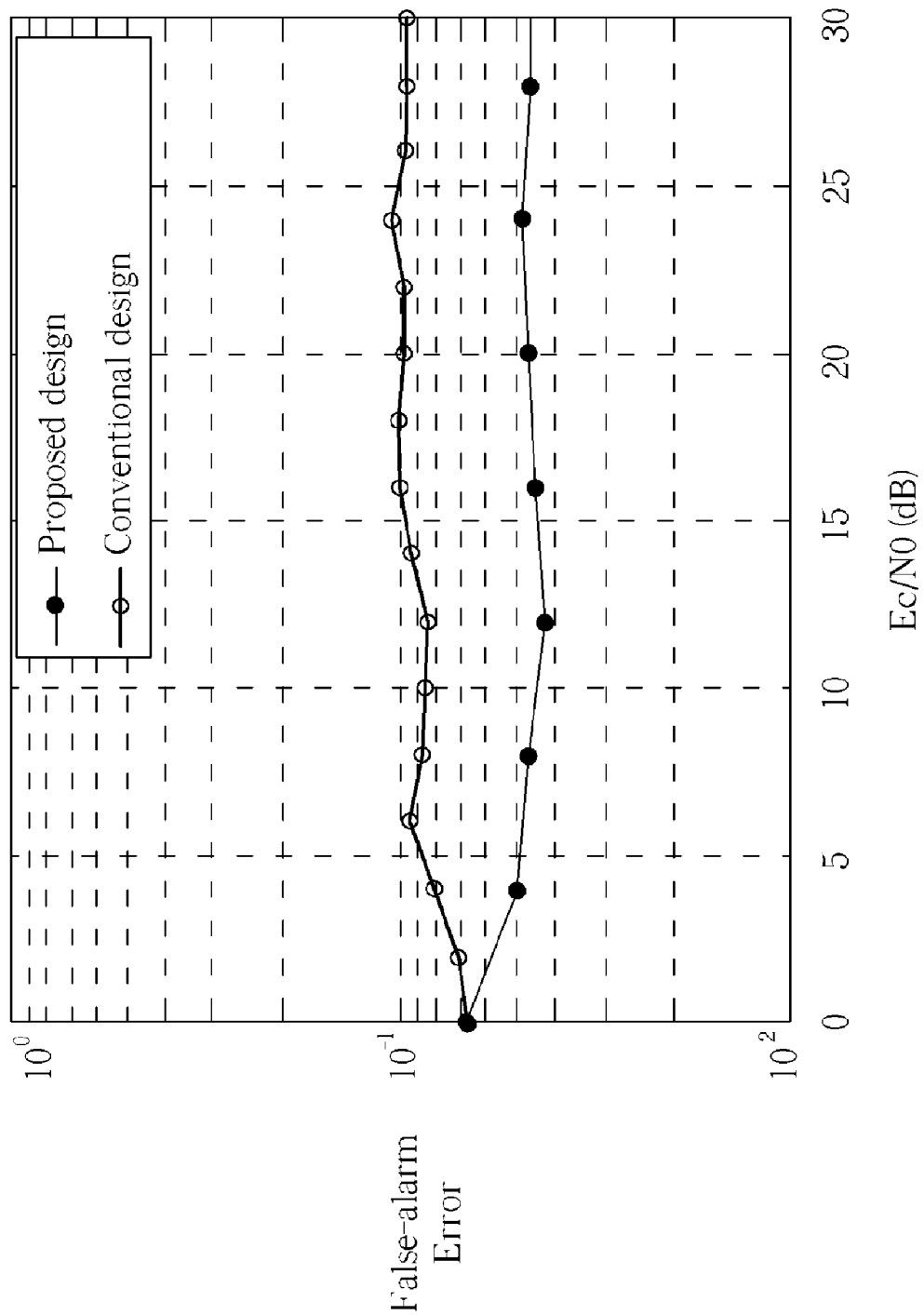
Figure 10:
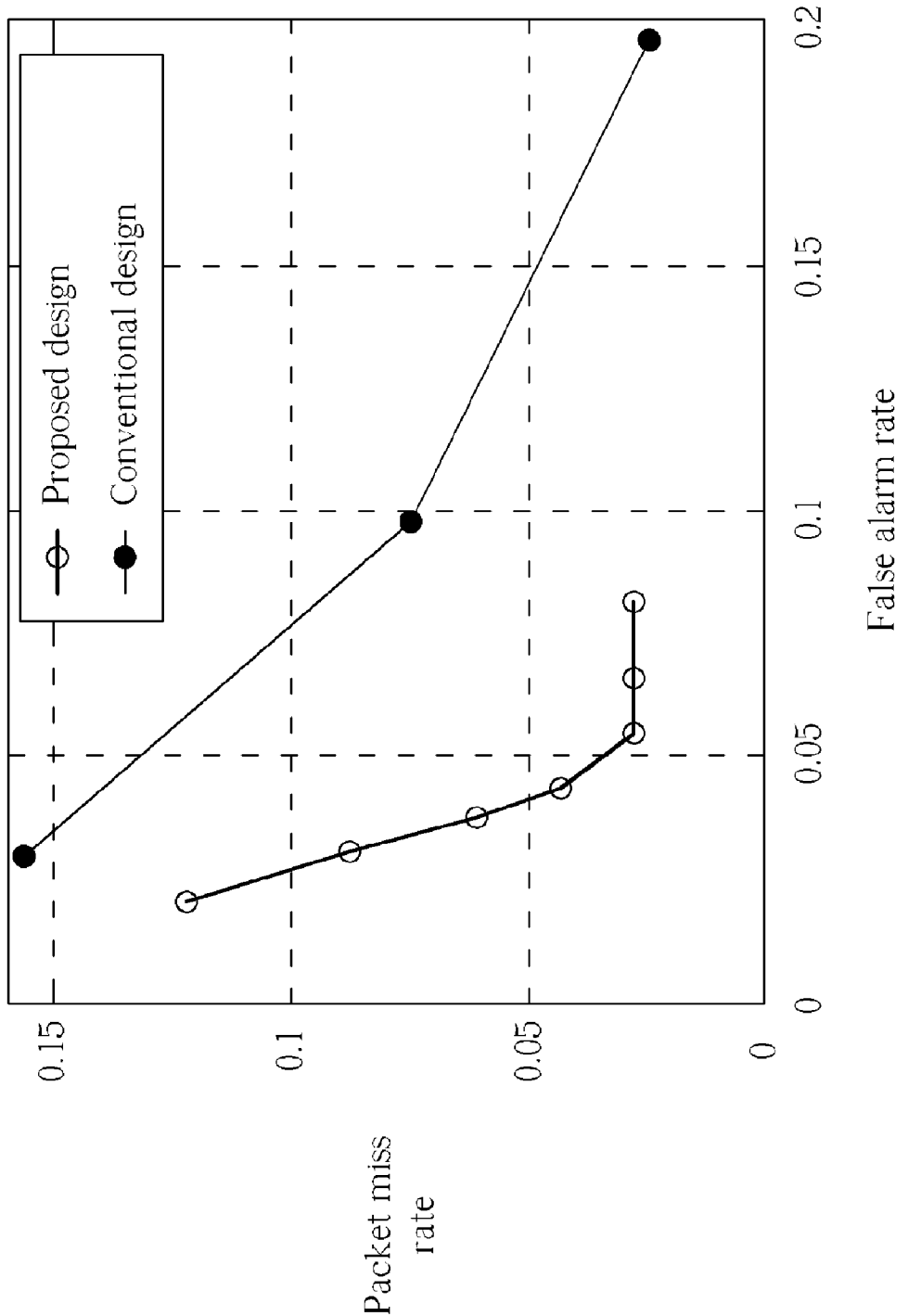
FIG. 10 shows the simulated improvements of the present invention in packet miss rate and false alarm rate when Ec/N0 is fixed at 10 dB.

FIG. 9(*a*) and FIG. 9(*b*) show the simulated improvements in packet miss rate and false alarm rate of the present invention respectively. The simulated condition is that the channel has 250 ns root-mean-squared (RMS) delay, and the interference is adjacent signals at +5 MHz neighboring the target signal. As can be seen from the simulation results, the packet miss rate is reduced to be less than $10^{-2}$ when Ec/N0 is 15 dB, where N0 represents noise power and Ec represents signal power, and the maximal false alarm rate in a worst channel condition is about 5%, which is a 5% improvement compared to the conventional receiver. Moreover, FIG. 10 shows the simulated improvements in packet miss rate and false alarm rate of the present invention when Ec/N0 is fixed at 10 dB. The proposed receiver design obtains great improvement in both packet miss rate and false alarm rate. The tolerant delay spread of multi-path channel of the proposed receiver design is 400 ns, which is a 150 ns improvement compared to the conventional receiver.

Note that the above embodiments of the receiver of the present invention all focus on the usage of frequency information of the input signal. However, the receiver can also apply the conventional correlation detecting ways utilizing time domain information of the input signal to further increase the accuracy of detection of the target signal. Different from the conventional receiver, a gain controller (or automatic gain controller) can be coupled to the transforming unit or coupled to the determining unit. That is, the timing of controlling the gain setting applied to the input signal is not limited. The gain setting can be controlled before the packet is transformed from the time domain to the frequency domain, or after the input signal is decided as the target signal. These alternative designs all fall within the scope of the present invention.

The present invention utilizes low complexity FFT-based spectrum analysis to minimize the adjacent channel interference, enhancing the detection capability and overcoming the signal distortion under severe multi-path channels. An advantage of the present invention is that the detecting mechanism starts immediately when a packet of the input signal is detected, and can take as little as 100 ns for the proposed signal quality detecting unit to detect an in-band OFDM signal or 45 ns to detect an in-band CCK signal. In other words, the detection of the in-band signal can be completed in the short preamble region of an OFDM/CCK signal. For example, if the transforming unit 220 utilizes 4-point FFT, only a symbol of the input signal is sufficient for packet differentiations, thereby achieving fast in-band signal detection.

Those skilled in the art will readily observe that numerous modifications and alterations of the device and method may be made while retaining the teachings of the invention.

What is claimed is:

1. A method of detecting a target signal complying with a specific communication specification comprising a specific spectrum characteristic, the method comprising:

detecting a packet of an input signal;

transforming the packet from a time domain to a frequency domain to derive a spectrum characteristic of the input signal; and determining whether the input signal is the target signal according to the spectrum characteristic of the input signal, wherein a spectrum of the input signal in the frequency domain comprises a plurality of output tones, comprising:

determining whether the input signal is the target signal according to magnitudes of the output tones.

2. The method of claim 1, wherein the step of determining whether the input signal is the target signal comprises:

determining whether the spectrum characteristic of the input signal satisfies a predetermined condition corresponding to the specific spectrum characteristic to generate a determining result; and when the determining result indicates the spectrum characteristic of the input signal satisfies the predetermined condition, deciding that the input signal is the target signal.

3. The method of claim 1, wherein the specific spectrum characteristic corresponds to a transmission spectrum mask.

4. The method of claim 1, wherein the packet is a preamble packet of the input signal.

5. The method of claim 1, wherein the output tones of the input signal are grouped into several groups, and the step of determining whether the input signal is the target signal comprises:

accumulating magnitudes of corresponding output tones in each group to generate an accumulated result;

determining whether the accumulated result satisfies a predetermined condition corresponding to the specific spectrum characteristic to) generate a determining result; and when the determining result indicates the accumulated result satisfies the predetermined condition, deciding that the input signal is the target signal.

6. The method of claim 5, wherein the spectrum of the input signal comprises an in-band frequency region and an out-band frequency region, and the predetermined condition is satisfied when an accumulated magnitude of a plurality of first output tones corresponding to the in-band frequency region is larger than that of a plurality of second output tones corresponding) to the out-band frequency region.

7. The method of claim 1, wherein the spectrum of the input signal comprises an in-band frequency region and an out-band frequency region, and the step of determining whether the input signal is the target signal according to magnitudes of the output tones comprises:

determining whether a magnitude of a first output tone corresponding to the in-band frequency region is larger than a magnitude of a second output tone corresponding to the out-band frequency region; and when the magnitude of the first output tone corresponding to the in-band frequency region is larger than the magnitude of the second output tone corresponding to the out-band frequency region, deciding that the input signal is the target signal.

8. The method of claim 7, wherein the first output tone is a maximum tone of output tones corresponding to the in-band frequency region and the second output tone is a maximum tone of output tones corresponding to the out-band frequency region.

9. The method of claim 1, further comprising:

frequency shifting the packet before the packet is transformed from the time domain to the frequency domain.

10. The method of claim 1, further comprising:

controlling a gain setting applied to the input signal before the packet is transformed from the time domain to the frequency domain or after the input signal is decided as the target signal.

11. The method of claim 1, wherein the specific communication specification is an OFDM specification or a complementary code keying (CCK) specification.

12. A receiver for receiving a target signal complying with a specific communication specification comprising a specific spectrum characteristic, the receiver comprising:

a detecting module, detecting a packet of an input signal;

a transforming unit, coupled to the detecting module, transforming the packet from a time domain to a frequency domain to derive a spectrum characteristic of the input signal, wherein a spectrum of the input signal in the frequency domain comprises a plurality of output tones; and a determining unit, coupled to the transforming unit, for determining whether the input signal is the target signal according to magnitudes of the output tones.

13. The receiver of claim 12, wherein the determining unit determines whether the spectrum characteristic of the input signal satisfies a predetermined condition corresponding to the specific spectrum characteristic to generate a determining result, and decides that the input signal is the target signal when the determining result indicates the spectrum characteristic of the input signal satisfies the predetermined condition.

14. The receiver of claim 12, wherein the specific spectrum characteristic corresponds to a transmission spectrum mask.

15. The receiver of claim 12, wherein the output tones of the input signal are grouped into several groups, and the determining unit comprises:

a magnitude accumulator, coupled to the transforming unit, accumulating magnitudes of corresponding output tones in each group to generate an accumulated result; and a comparing unit, coupled to the magnitude accumulator, determining whether the accumulated result satisfies a predetermined condition corresponding to the specific spectrum characteristic to generate a determining result, and deciding that the input signal is the target signal when the determining result indicates the accumulated result satisfies the predetermined condition.

16. The receiver of claim 15, wherein the spectrum of the input signal comprises an in-band frequency region and an out-band frequency region, and the predetermined condition is satisfied when an accumulated magnitude of a plurality of first output tones corresponding to the in-band frequency region is larger than that of a plurality of second output tones corresponding to the out-band frequency region.

17. The receiver of claim 12, wherein the spectrum of the input signal comprises an in-band frequency region and an out-band frequency region, and the determining unit comprises:

a first comparator, selecting a first output tone having a maximum magnitude among the output tones corresponding to the in-band frequency region;

a second comparator, selecting a second output tone having a maximum magnitude among the output tones corresponding to the out-band frequency region; and a third comparator, coupled to the first comparator and the second comparator, comparing magnitude of the first output tone and magnitude of the second output tone to generate the determining result;

when the magnitude of the first output tone is larger than the magnitude of the second output tone, the determining unit decides that the input signal is the target signal.

18. The receiver of claim 12, further comprising:

a frequency shifter, coupled to the transforming unit, for frequency shifting the packet before the packet is transformed from the time domain to the frequency domain.

19. The receiver of claim 12, wherein the receiver is implemented in an OFDM system or a complementary code keying (CCK) system.

* * * * *